Oct. 28, 1958     D. PARMLEE     2,857,703
FISHING RIG
Filed Feb. 28, 1955
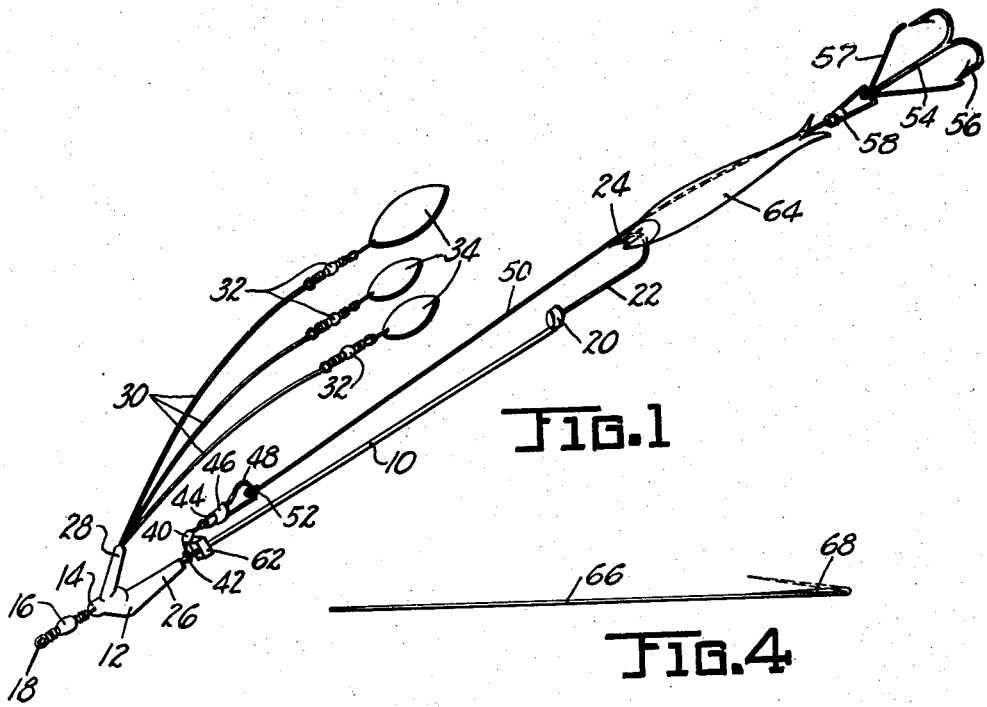
Fig.1
Fig.4
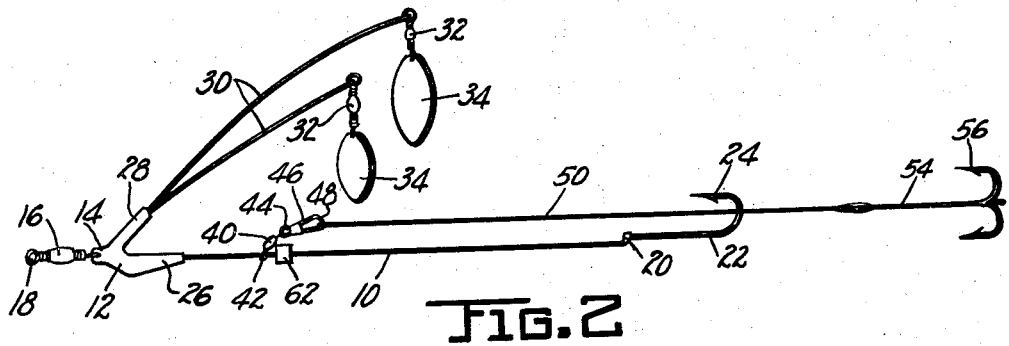
Fig.2
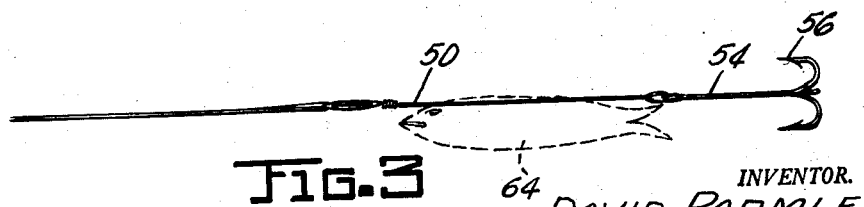
Fig.3
INVENTOR.
DAVID PARMLEE
BY
Eugene C. Knoblock
ATTORNEY

United States Patent Office 2,857,703
Patented Oct. 28, 1958

2,857,703
FISHING RIG

David Parmlee, South Bend, Ind.

Application February 28, 1955, Serial No. 490,725

4 Claims. (Cl. 43—42.28)

This invention relates to improvements in fishing rigs, and more particularly to fishing rigs employing minnows or other live bait.

The primary object of the invention is to provide a fishing rig mounting live bait in a natural position and so constructed that the minnow or live bait cannot spiral or spin as the fishing rig is trolled through the water.

A further object is to provide a fishing rig having hooks which are substantially hidden and which are so positioned that the rig is rendered relatively weedless in operation while at the same time insuring that the hooks will be available to catch a fish which strikes the rig.

A further object is to provide a fishing rig for use with live bait which can accommodate a wide range of sizes of live bait without variation of the reaction thereof in the water or without destroying the attractiveness of the rig to fish.

A further object is to provide a fishing rig for use with minnows so constructed that the minnow may be mounted thereon without harming the same, so that the minnow will remain alive even though retained by the rig.

Other objects will be apparent from the following specification.

In the drawing:

Fig. 1 is a perspective view illustrating one embodiment of the invention with a minnow used as the live bait anchored thereto;

Fig. 2 is a side view of the rig without live bait mounted thereon;

Fig. 3 is a side view of a part of the device illustrating the manner in which live bait is anchored on the rig;

Fig. 4 is a fragmentary view of the rig mounting the unit or needle employed with the device.

Referring to the drawing which illustrates the preferred embodiment of the invention, the numeral 10 designates an elongated rod which is formed of stiff shape-retaining material, such as metal wire. A weight 12 is secured at the front end of the body 10 and includes an apertured front projecting portion 14, to which is attached a conventional line-attaching swivel 16 of the character well known in the fishing art, and providing at its outer end at 18 an eyelet by means of which a fishing line may be attached to the device.

At its opposite end the body 10 is bent or laterally offset at 20 and has fixedly secured thereto, as by soldering, welding or riveting, the end of the shank 22 of a fish hook 24 which is preferably of the single prong type. The shank 22 preferably extends substantially parallel to and projects rearwardly longitudinally from the end of the body 10 in upwardly offset relation to said body.

The weight 12 is preferably substantially V-shaped in general overall outline as seen in Fig. 2. The shape of the weight is such that the lower arm 26 of the weight extends substantially longitudinally parallel to the body 10 with the major portion of its mass located below the level of the body 10. The line-attaching forward projection 14 of the weight is preferably slightly upwardly offset from the level of the body 10 at the front thereof, as best seen in Fig. 2. A rearwardly upwardly inclined arm 28 completes the weight. The arm 28 has fixedly anchored thereto the end portions of a plurality of elongated spring wires 30 extending upwardly at an angle to the body 10 and diverging to extend at an angle to each other. The weight 12 is preferably formed of lead or other material having low melting point and is adapted to be cast to desired form preferably with the body 10 and the wires 30 imbedded therein. Any other suitable means for anchoring the wires 30 which may be found suitable may be employed if desired. The rear upper free end of each of the wires 30 carries a swivel member 32 for attachment of a small attention-attracting and water-disturbing member 34. The members 34 are preferably metal blades, spoons, disks, or spangles. The members 34 are so positioned by the wires 30 that each is free to swivel, swing or otherwise react with the water independently of the others, that is, without striking the others, or the body 10 or other parts of the lure.

A swivel member 40 has an eyelet 42 slidably embracing the body 10 and having at its opposite end an eyelet 44 interlocked with the eyelet 44 of a conventional fastener member 46 preferably of the safety catch type employing an elongated wire loop member 48 anchored at one end of the fastener and having its opposite end hooked or detachably interlocked with the central body portion of the fastener. A leader 50 has a looped end 52 adapted to be anchored by the fastener part 48. At its opposite end the leader 50 mounts a shank 54 of a fish hook 56, preferably of the multiple prong type as shown. If desired, a safety fastener 58 may be mounted upon the leader to provide a detachable connection of the hook shank 54 to the leader. Also, if desired, the hook 54, 56 may have spring fingers secured to the shank thereof extending adjacent to the hook prongs to form a weed guard. The length of the leader 50 will preferably be such that a portion thereof will project rearwardly beyond the prong 24 of the hook 22 when the eyelet 40 is located adjacent the weight 12 at the front end of the rig. The position of the leader lengthwise of the body 10 will preferably be adjustable, and for this purpose a block 62 of friction material, such as rubber, having an aperture therein accommodating snug gripping fit thereof upon the elongated body 10, is mounted upon the body. The arrangement is such that when the block is positioned at any selected location along the length of the body 10 it will remain in that position and will form a stop abutted by the swivel member 40 or associated parts and regulating the position at which the body encircling eyelet 42 of swivel member engages the body 10.

The device is intended primarily for use with live bait, such as minnows 64, and it is contemplated that the leader 50 will be passed through the minnow or other live bait just under the skin thereof and in such a manner that none of the vital organs of the minnow or live bait are penetrated thereby. In order to accomplish mounting of a minnow upon the leader in this fashion I provide a long needle member 66, as seen in Fig. 4. This needle preferably includes a return bent portion 68 which is elongated and tapered toward its free end and is adapted to lie flat against the portion of the needle from which it is bent, so as to flare from the needle body in a substantially streamline fashion. At the same time the member 68 may be spread to the dotted line position for insertion of the loop 52 at its leading end into the eye portion of the needle defined by the member 68, it being understood that the leader 50 will be disconnected from safety lock 46 of the fishing rig. The sub-assembly of the needle 66 and leader 50 is then applied to the minnow 64 by passing the point of the needle under the skin of the minnow adjacent the rear end of the backbone of the minnow and thence lengthwise to a point adjacent the head of the minnow at which the needle is permitted to emerge. Thereupon a longitudinal pull of the needle and leader relative to the minnow causes the minnow to be transferred from the needle to the leader and preferably to the rear end of the leader, as illustrated in Fig. 1. Thereupon the needle 66 can be disconnected and the loop 52 of the leader 50 can be reengaged by the safety fastener 46, 48 for assembly in the fishing rig. The lower jaw of the minnow 64 is then impaled upon the prong 24 of the hook 22 of the fishing rig so that the minnow 64 is anchored or carried by two separate parts of the rig, namely, the leader 50 and the hook 22. The position of the rear trailing hook 56 relative to the hook 22 can be regulated at will and will be determined in part by the length of the live bait item, such as the minnow 64, impaled by the hook 22 and to be positioned forwardly of the hook 56. Such adjustment is accommodated by sliding the positioning block 62 to desired position along the body 10. It will be understood that in this manner the length of the live bait can be accommodated through substantially wide range.

The distribution of weight in the device resulting from the shape of the weight 12, the downwardly off-centered location of the member 10, the upward offset relation of the member 22 to the weight itself, and other characteristics, insure that the lure will ride in an upright position as it is trolled, that is, with the wires 30 projecting upwardly and the spangles 34 usually located above water level. Some lateral rocking of the lure may occur, particularly incident to movement of the minnow impaled by the rig. However, such lateral rocking will not proceed to the point of resulting in spinning or turning of the lure within the water because of counter-weighting of the device, as described above.

One of the important considerations of the construction is the fact that while the live bait is securely anchored to the rig at two points, namely, by the hook 22 and the leader 50, the flexibility of the body of the live bait is retained, and the mounting is such as to leave the minnow free to move in a natural swimming action, if it so desires. Thus the impaling of the minnow at the lower jaw insures against pulling of the minnow clear of the rig, and the impaling of the minnow along the skin near the backbone by a flexible impaling member insures that the minnow cannot break loose from the rig. Thus the minnow is so positioned as to substantially conceal the front hook 22 and to be located between that front hook and the rear hook 56. Consequently any strike which occurs will almost certainly result in hooking of the fish which strikes so that loss of a strike is to a minimum.

Another characteristic of the device is that the live bait serves to orient and position the hooks 22 and 56 relative to each other and to retain the desired orientation substantially constant. This is an advantage since otherwise the free trailing hook could easily foul itself on an obstruction as it passes through the water, which action is substantially prevented in the present construction because the body of the minnow or live bait itself acts somewhat as a weed guard to protect against impingement both at the front hook 22 and at the trailing hook 56.

No problem is presented by the flexibility and length of the leader 50 in the event a fish strikes the trailing hook 56, because the leader has connection direct with the body 10. Consequently, even if the strike would result in destruction of the live bait, the consequent separation of the hook 56 from the normal orientation thereof relative to the hook 22 resulting from the impalement of the minnow or other bait, no danger of release of the hook by the fish will occur. Thus a direct heavy pull by the fish upon the hook 56 may result in sliding rearwardly of the leader along the body 10 to a limit of the length of that body, but further movement is not possible and the fish may be played as if it had been caught on any other type of fishing tackle.

While the preferred embodiment of the invention is illustrated and described herein, it will be understood that changes in the construction may be made within the scope of the appended claims without departing from the spirit of the invention.

I claim:

1. A fishing rig comprising a rigid elongated rod-like body, line-attaching means carried by the front of said body, a hook fixedly mounted and projecting substantially longitudinally at the rear of said body in upwardly off-set relation, an elongated flexible leader, means anchoring said leader to said body at a selected position along the length of the body and forwardly of said hook, said leader being adapted to longitudinally impale live bait, said hook being adapted to impale the front portion of said live bait, a second hook carried by said leader rearwardly of said live bait, and a counter weight carried by the front part of said body and downwardly off-set therefrom to orient said body in selected attitude as it is drawn through the water.

2. A fishing rig comprising a rigid elongated wire body, line-attaching means carried by the front of said body, a hook fixedly mounted at the rear of said body with its curved pointed end projecting upwardly, an elongated flexible leader connected to said body forwardly of said hook and adapted to longitudinally impale live bait, means for positioning said leader connection in selected location on said wire body, said hook being adapted to impale the front portion of said live bait, a second hook carried by said leader rearwardly of said live bait, a weight fixed on said body, the weight carrying portion of said body being downwardly offset relative to said line-attaching means and said first hook to counterweight said fishing rig.

3. A fishing rig comprising a rigid elongated rod-like body, line-attaching means carried by the front of said body, a hook fixedly mounted and upwardly offset at the rear of said body, an elongated flexible leader connected to said body forwardly of said hook and adapted to impale live bait, said hook being adapted to impale the front portion of said live bait, a second hook carried by said leader rearwardly of said live bait, said leader having a sliding connection with said body, and an abutment adjustably anchored lengthwise on said body rearwardly of the connection between said leader and said body.

4. A fishing rig comprising an elongated rigid rod-like body, line-attaching means carried by the front of said body, a hook fixed in upwardly offset relation to the rear of said body, a flexible elongated member connected to said body forwardly of said hook, a hook carried by said flexible member, a bait impaled by and projecting rearwardly from said first hook and impaled by said flexible elongated member to orient said second hook, and an abutment adjustably carried by and frictionally engaging said body for selectively positioning the point of connection of said leader lengthwise of said body.

References Cited in the file of this patent

UNITED STATES PATENTS

| | | |
|---|---|---|
| 756,009 | Flegle | Mar. 29, 1904 |
| 764,171 | Bingenheimer | July 5, 1904 |
| 801,649 | Coffin | Oct. 10, 1905 |
| 1,163,244 | Lawrence | Dec. 7, 1915 |
| 1,295,617 | Shannon | Feb. 25, 1919 |
| 1,522,019 | Mantz | Jan. 6, 1925 |
| 1,902,217 | Catarau | Mar. 21, 1933 |
| 2,608,791 | Wentz | Sept. 2, 1952 |
| 2,645,051 | Stofleth | July 14, 1953 |
| 2,791,059 | Holmberg | May 7, 1957 |